April 17, 1951   L. JACOBI   2,549,096
INDICATOR FOR GEAR SHIFT MECHANISMS
Filed Oct. 27, 1949   2 Sheets-Sheet 1

Inventor
Louis Jacobi
by James D. Coffee
Attorney

April 17, 1951

L. JACOBI 2,549,096

INDICATOR FOR GEAR SHIFT MECHANISMS

Filed Oct. 27, 1949

Inventor
Louis Jacobi by James F. Coffee
Attorney

Patented Apr. 17, 1951

2,549,096

UNITED STATES PATENT OFFICE 2,549,096

INDICATOR FOR GEARSHIFT MECHANISMS

Louis Jacobi, Milwaukee, Wis., assignor to Allis-Chalmers Manufacturing Company, Milwaukee, Wis., a corporation of Delaware Application October 27, 1949, Serial No. 123,857

7 Claims. (Cl. 116—124)

This invention relates generally to variable speed transmissions and is more particularly concerned with gear ratio indicating means for gear shift levers.

In vehicles having variable speed transmission units affording a number of selective driving gear ratios it is desirable to have some means for indicating the correct position of the gear shift lever for each gear ratio, particularly where the number of possible shift lever positions is great and/or such positions deviate from the conventional arrangement wherein four speeds are selectable by moving the shift lever through a path generally describing the letter H. Heretofore, indicating means for gear shift levers have generally followed one of two separate courses with one type including a bracket, either associated with the shift lever or separate therefrom, indicating the relative selectable positions for the lever in order to achieve the various gear ratios. The other type of indicating means includes parts associated with the shift lever and coacting therewith to indicate the gear ratio for any single position of the lever. This latter type, of course, does not indicate where the lever must be moved to in order to achieve a different gear ratio. Applicant's invention is directed to an improvement of the first type mentioned with particular application to a double range transmission.

It is a primary object of the present invention to provide a gear shift indicating means, for a double range transmission having a single shift lever, comprising parts constructed and combined in a novel manner for coaction with the gear shift lever to indicate all of the possible positions for such lever in a chosen range of speed.

Another object of this invention is to provide a gear shift indicating means of the type mentioned wherein the shifting of the lever from the neutral position in one speed range to the neutral position in the other speed range results in covering the indicating part for the first range and exposing that of the second.

And accordingly the present invention may be considered as comprising the various constructions and combinations hereinafter more particularly pointed out in the detailed description and claims, reference being had to the accompanying drawings in which:

Figure 1:
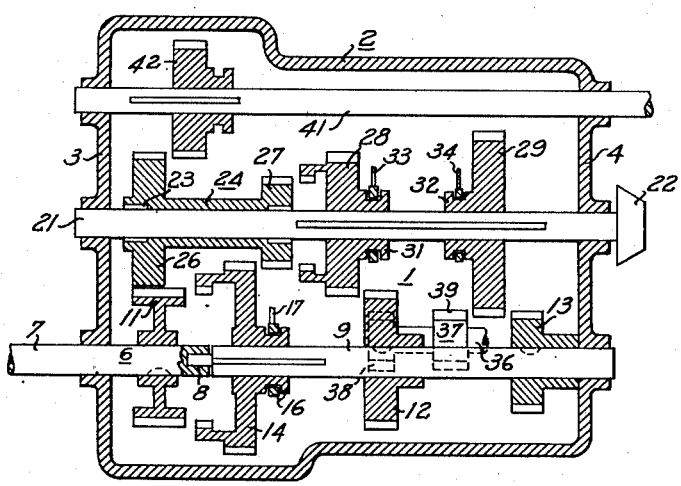
Fig. 1 is a schematic showing of a transmission used to illustrate the present invention.

Referring now to Fig. 1 it will be seen that apparatus embodying the present invention comprises a double range power transmission unit 1 enclosed in a housing 2 having a front wall 3 and a rear wall 4. Since the gear arrangement forms no essential part of the present invention and merely illustrates a use therefor, it is believed that the schematic illustration shown in Fig. 1 is sufficient for a complete understanding of the invention. A more detailed description of the transmission is shown in my United States Patent Number 2,506,671, issued May 9, 1950.

A two piece input shaft 6 is rotatably mounted within housing 2 with the forward section 7 thereof being connected in driven relation with a power unit (not shown) and having a short recessed coaxial bore 8 at its end adjacent the rear shaft section 9 affording a means for piloting the adjacent end of rear shaft section 9 therein to provide relative rotation between the two sections of the input shaft. Forward section 7 of the input shaft has a gear 11 nonrotatably mounted thereon in axially fixed relation therewith, and rear shaft section 9 likewise fixedly mounts nonslidable gears 12 and 13 in axially spaced relation to one another and to gear 11. The end of shaft section 9 adjacent the forward shaft section 7 has an externally splined portion slidably mounting a range selecting gear 14 having an internally splined hub portion coacting with the splined shaft portion to fix the gear against rotation relative to the input shaft. The hub portion of gear 14 also includes a shift collar 16 for engagement by a shift fork 17 to move the gear along the splined portion of the shaft.

A shaft 21 which forms the output shaft for the transmission is rotatably mounted in housing 2 in vertically spaced parallel relation to input shaft 6. The rear portion of shaft 21 extends through wall 4 and has a bevel gear 22 fixedly mounted on its projecting end portion for driving engagement with a differential mechanism (not shown). The forward end portion of output shaft 21 has rotatably mounted thereon, as by bearings 23, an integrally formed gear cluster 24 having a first gear section 26 positioned for constant meshing engagement with gear 11 and having a second gear section 27 adapted for engagement by range selector gear 14. The rear portion of output shaft 21 is externally splined to carry axially shiftable speed selector gears 28 and 29 thereon. The internal portion of the hubs on these gears are splined to match the splines on shaft 21 and each gear includes a shift collar 31 and 32, respectively, for engagement by shift forks 33 and 34. A countershaft 36 rotatably mounted in housing 2, in a conventional manner not shown, in adjacent parallel relation to input shaft 6 has rotatably mounted thereon a reverse idler gear cluster 37 comprising a gear section 38 in constant mesh with gear 12 and a gear section 39 positioned for selective engagement by shiftable gear 29. A fourth shaft 41 rotatably mounted in the upper portion of housing 2 has an axially slidable gear 42 nonrotatably mounted thereon and provides means for selectively driving a power take-off mechanism (not shown). Since the power take-off forms no part of the present invention a further description thereof is believed unnecessary.

The gear arrangement just described affords a selection of either of two ranges of speed, high and low, with the low range including a first, second and reverse speed and the high range including a third, fourth and fifth speed. More specifically, shiftable gear 14 has external and internal sets of teeth adapted for selective meshing engagement with gear section 27 of cluster 24 and gear 11, respectively, to achieve the low and high range of speeds. Speed selector gear 28 also has internal and external sets of teeth adapted for engagement with gear section 27 of cluster 24 and gear 12 on the input shaft, respectively. Speed selector gear 29 is shiftable to selectively engage either gear 13 on input shaft 6 or reverse idler gear 39.

As mentioned above, shifting gear 14 to the right into engagement with gear section 27 of cluster 24 affords a further selection of one of the low speeds or reverse. With gear 14 in engagement with gear section 27 a shifting of gear 29 into engagement with gear 13 produces a first speed for output shaft 21, and a shifting of gear 28 into engagement with gear 12 achieves a second speed. Reverse speed is achieved by shifting gear 29 into engagement with idler gear 39.

A selection of one of the speeds in the high range is made possible by shifting gear 14 into engagement with gear 11. Thereafter a shifting of gear 29 into engagement with gear 13 effects a third speed, a shifting of gear 28 into engagement with gear 12 effects a fourth speed and when this same gear 28 is shifted forward to engage gear section 27 of cluster 24 a fifth speed is produced at the output shaft. In the illustrated preferred embodiment reverse speed in the high range is locked out in a manner to be described later.

Figure 5:
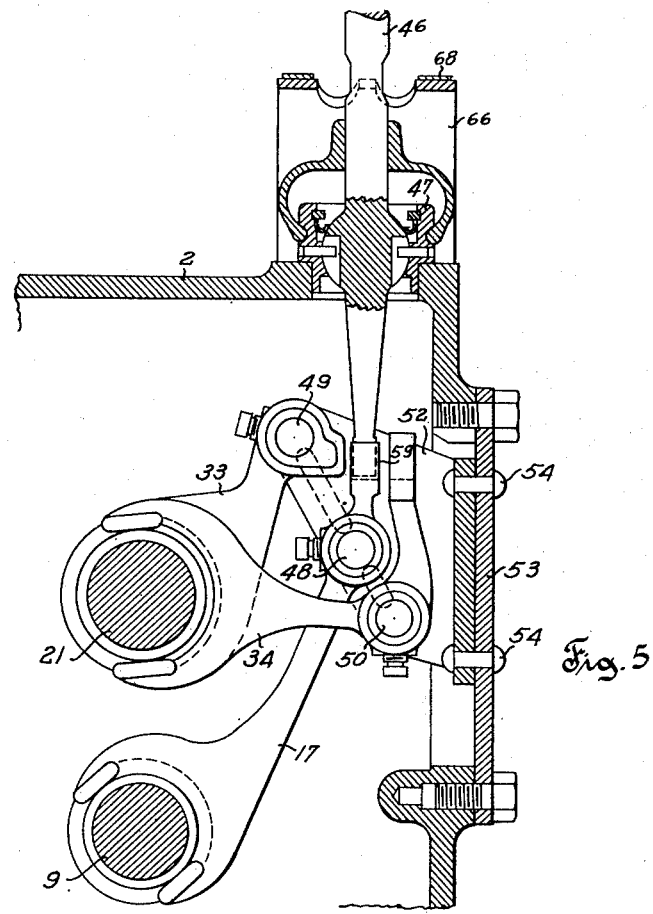
Fig. 5 is an end view of the transmission embodying the invention with parts broken away or omitted to more clearly show the shift fork arrangement.

Referring now to Fig. 5 it may be seen that shifting mechanism affording the above described speed changing operation comprises a gear shift lever 46 pivotally mounted in the top of housing 2 in a conventional manner by a bracket 47 affording universal movement of the lever. The upper portion of the lever projects above housing 2 in position for actuation by the operator and the lower portion extends into the housing in position for selective engagement with lug portions of shift forks 17, 33 and 34 axially fixed on shift rods 48, 49, 50, respectively. And in this connection shift rod 48 mounts shift fork 17 which engages collar 16 on speed range selector gear 14, shift rod 49 carries shift fork 33 which engages collar 31 on gear 28 and shift rod 50 carries shift fork 34 which engages collar 32 on gear 29.

Figure 6:
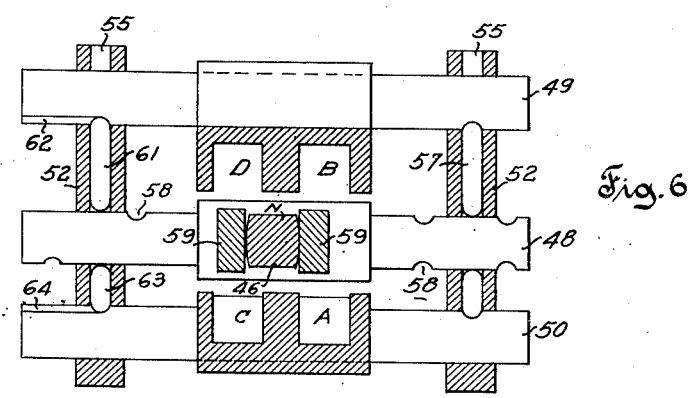
Fig. 6 is a schematic illustration of the shift fork interlock shown in part in Fig. 5.

A conventional type interlock device (Fig. 6) associated with shift rods 48, 49 and 50 affords proper coaction between shift lever 46 and lugs on each shift fork in the usual manner. More particularly, a pair of brackets 52 fixed at one end to removable plate 53 (Fig. 5) on the housing, as by rivets 54, support the shift rods and parts carried thereby. These brackets have longitudinal bores 55 therethrough into which plungers 57 are inserted between adjacent shift rods. The shift rods have grooves 58 formed along the outer surface thereof to coact with plungers 57 to limit axial movement of the shift rods. Center shift rod 48 carries shift fork 17 which in turn is provided with axially spaced lug portions 59 adapted to receive the lower end of shift lever 46 therebetween when the latter is in its neutral position wherein no power is transmitted to the output shaft. When thus positioned, an actuation of lever 46 to move rod 48 to the right, as viewed in Fig. 6, places the lever in low range neutral position from which it may be moved to position its lower end in either opening A or in opening B. When in position A, lever 46 may then be further shifted to move rod 50 and gear 29 either to the right or left as desired. Movement to the right (note Fig. 1) engages gear 29 with gear 13 to effect first speed, whereas movement to the left engages gear 29 with idler 39 for reverse speed. When in position B lever 46 is only further actuable to move rod 49 to the right, engagement of plunger 61 with the right hand end of groove 62 preventing movement to the left, this movement engaging gear 28 with gear 12 for second speed. Actuation of lever 46 to move rod 48 to the left (Fig. 6) places the lever in high range neutral position from which it may be moved to position its lower end in either opening C or in opening D. When in position C, lever 46 may then be further shifted to the right only and thereby engage gear 29 with gear 13 for third speed. In this position movement to the left is prevented by engagement of plunger 63 with the right hand end of groove 64 thereby locking out reverse speed in the high range. When in position D lever 46 may then be further shifted to move rod 49 and gear 28 either to the right or left as desired. Movement to the right engages gear 28 with gear 12 for fourth speed, whereas movement to the left engages gear 28 with gear 27 for fifth speed.

Figure 2:
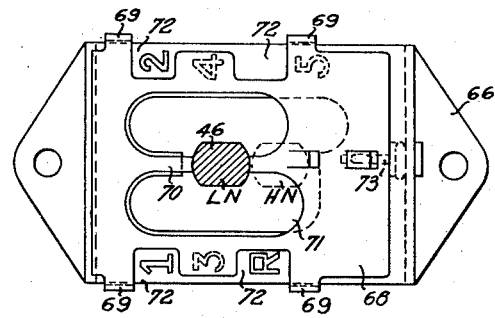
Fig. 2 is a plan view of gear indicating mechanism embodying the present invention.
Figure 3:
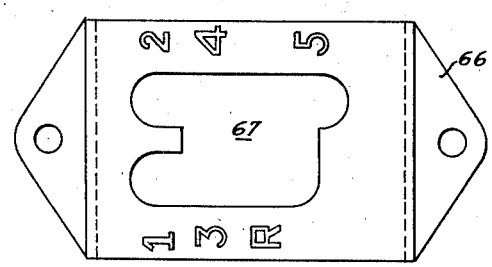
Fig. 3 is a plan view of the stationary bracket shown in Fig. 2.
Figure 4:
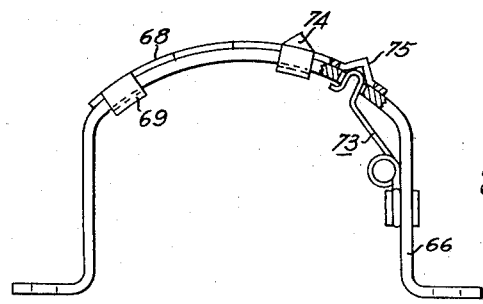
Fig. 4 is a side elevation of the structure in Fig. 2 with the gear shift lever omitted.

And looking now to Figs. 2, 3 and 4 it is seen that, in order to inform the operator at all times as to the operating speed range and speed ratio of the transmission gears, there has been devised an indicating means comprising a stationary bracket 66 mounted on housing 2 in covering relation to the supporting structure for shift lever 46 and having an opening 67 therein through which the shift lever projects. And it will be noted that the upper surface of bracket 66 has numerals stamped thereon, adjacent opposite side edges, indicating the various speeds afforded by the transmission.

A plate 68 conforming generally in size and shape to the upper surface of bracket 66 is slidably fastened thereon, as by crimped edge portions 69 or other suitable means, and has an opening 71 therethrough, generally coinciding with opening 67 in bracket 66, to permit pivotal movement of the shift lever. The opposite sides of this plate have portions cut away to provide openings 72 sufficiently large to expose the numbers on bracket 66 when such openings are placed in overlying relation thereto. When lever 46 is in either of its neutral positions, with the lower end of the lever engaging lug portions 59 on rod 48 (Fig. 6), a portion of the lever engages inwardly projecting center portions 70 of plate 68 so that movement of the lever to the right or left (as viewed in Fig. 6) effects a similar movement of the index plate. More particularly, movement of lever 46 to the left into the low range neutral position LN (Fig. 2) also moves plate 68 to a position covering numerals 3, 4 and 5 and exposing numerals 1, 2 and R through openings 72. And movement of lever 46 to the right into high range neutral position HN effects a similar movement of plate 68 to a position covering numerals 1, 2 and R and exposing numerals 3, 4 and 5. And in this connection it will be noted in Figs. 2 and 4 that bracket 66 carries a detent mechanism in the form of a spring biased latch means 73 which coacts with longitudinally spaced raised portions 74 and 75 of shiftable plate 68 to releasably secure plate 68 in position to expose the proper numerals through openings 72 for either speed range. When lever 46 is shifted into the neutral position LN, plate 68 is likewise shifted and latch means 73 engages raised portion 74 to secure the plate against further movement while the shift lever is being moved to effect first, second or reverse speed. However, when lever 46 is returned to its center position LN and then moved to the high range neutral position HN, the latch means yields to permit sliding movement of plate 68 relative to bracket 66 until raised portion 75 is engaged by latch means 73 to fix the index plate while lever 46 is free to move to effect third, fourth or fifth speed.

In operation the index device functions in the following manner. As shown in Fig. 2 gear shift lever 46 is in neutral position LN for the low range of speeds which are exposed as being 1, 2 and R, it being noted in this connection that movement of this upper portion of the shift lever is opposite to the lower end thereof as described in connection with Fig. 6. From this position the operator may move the lever to the right or left to engage lug openings A or B (Fig. 6) and then by moving lever 46 opposite one of the exposed numbers on bracket 66 the corresponding speed ratio is effected in the transmission. And when it is desired to shift into a gear in the high speed range it is only necessary to first move the lever to position LN and then to the high neutral position HN (indicated by dotted lines in Fig. 2). The latter movement will also shift plate 68 in the same direction (to the right as viewed in Fig. 2) thereby covering the low range markings and reverse and exposing the high range markings 3, 4 and 5. This places the lower end of shift lever 46 opposite openings C and D (Fig. 6) in position to (1) shift rod 50 to the right thereby engaging gear 29 with gear 13 for third speed or (2) shift rod 49 either to the right wherein gear 28 meshes with gear 12 for fourth speed or to the left wherein gear 28 meshes with gear 27 for fifth speed.

It is seen from the foregoing that at all times the operator will have a definite indication of (1) the speed ratio presently used in the transmission, and (2) the position for the shift lever for other speeds in the same range.

And, although shown and described with respect to a two range variable speed transmission having five speeds forward and one reverse, it is to be understood that it is not intended to limit the invention to the exact constructions and combinations shown and described as certain features thereof are of more general application and as various modifications within the scope of the appended claims may occur to persons skilled in the art. Furthermore, it is to be understood that the terms "high" and "low" as applied to the speed ranges and neutral positions are to be considered as used merely in a relative distinguishing sense.

It is claimed and desired to secure by Letters Patent:

1. In a shift mechanism for variable speed transmissions, a stationary indicator bracket having a set of low range speed markings and a set of high range speed markings, a gear shift lever movable from a low range neutral position to a selected one of a plurality of drive establishing positions opposite the respective low range marking on said bracket, and from a high range neutral position to a selected one of a plurality of drive establishing positions opposite the respective high range marking on said bracket, and an indexing plate movable with said gear shift lever when the latter is shifted from one of said neutral positions to the other of said neutral positions, said indexing plate being adapted to cover said set of high range speed markings and to expose said set of low range speed markings upon movement of said gear shift lever to said low range neutral position, and to cover said set of low range speed markings and to expose said set of high range speed markings upon movement of said plate into said high range neutral position.

2. In a shift mechanism for variable speed transmissions, a stationary indicator bracket having a set of low range speed markings and a set of high range speed markings, a gear shift lever movable from a low range neutral position to a selected one of a plurality of drive establishing positions opposite the respective low range marking on said bracket, and from a high range neutral position to a selected one of a plurality of drive establishing positions opposite the respective high range marking on said bracket, and an indexing plate movable with said gear shift lever when the latter is shifted from one of said neutral positions to the other of said neutral positions, said indexing plate exposing the set of speed range markings corresponding to the selected one of said low and high range neutral positions of said shift lever and covering the set of speed range markings corresponding to the other neutral position of said lever.

3. In a shift mechanism for variable speed transmissions, a stationary indicator bracket having a set of low range speed markings and a set of high range speed markings, a gear shift lever movable from a low range neutral position to a selected one of a plurality of drive establishing positions opposite the respective low range marking on said bracket, and from a high range neutral position to a selected one of a plurality of drive establishing positions opposite the respective high range marking on said bracket, an indexing plate movable with said gear shift lever when the latter is shifted from one of said neutral positions to the other of said neutral positions, said indexing plate being adapted to cover said set of high range speed markings and to expose said set of low range speed markings upon movement of said gear shift lever to said low range neutral position, and to cover said set of low range speed markings and to expose said set of high range speed markings upon movement of said plate into said high range neutral position, and means for releasably retaining said indexing plate in the neutral position to which it is moved by the shift lever while the latter moves relative thereto into a selected one of said drive establishing positions.

4. In a shift mechanism for variable speed transmissions, a stationary indicator bracket having a set of low range speed markings and a set of high range speed markings, a gear shift lever movable from a low range neutral position to a selected one of a plurality of drive establishing positions opposite the respective low range marking on said bracket, and from a high range neutral position to a selected one of a plurality of drive establishing positions opposite the respective high range marking on said bracket, and an indexing plate movable with said lever when the latter is shifted from one of its neutral positions to the other of its neutral positions, said plate having openings therethrough to expose the low range speed markings upon movement of said lever to the low range neutral position and to expose the high range speed markings upon movement of said lever to the high range neutral position.

5. In a shift mechanism for a double range change speed transmission, a stationary indicator bracket having a set of low range speed markings and a set of high range speed markings, a gear shift lever generally normal to said bracket and extending therethrough, said lever being movable from a low range neutral position to a selected one of a plurality of drive establishing positions opposite the respective low range marking on said bracket, and from a high range neutral position to a selected one of a plurality of drive establishing positions opposite the respective high range marking on said bracket, and an indexing plate disposed in partially covering relation to said bracket and movable with said gear shift lever when the latter is shifted from one neutral position to the other neutral position to cover the set of range speed markings corresponding to said one neutral position and expose the set of range speed markings corresponding to said other neutral position.

6. In a shift mechanism for a double range change speed transmission, a gear shift lever selectively movable to either a high range or a low range neutral position and then further movable from the selected neutral position to a selected one of a plurality of drive establishing positions in the corresponding range, a stationary plate generally normal to said lever and having an opening therethrough to receive said lever, and a movable plate generally parallel to said stationary plate and also having an opening therethrough to receive said lever, one of said plates having markings thereon to indicate the several gear ratios in both ranges of speed, and the other of said plates having openings therethrough exposing said markings for all gear ratios in the high speed range upon movement of said lever to said high range neutral position and exposing said markings for all gear ratios in the low range upon movement of said lever to said low range neutral position.

7. In a shift mechanism for a double range change speed transmission, a gear shift lever selectively movable to either a high range or a low range neutral position and then further movable from the selected neutral position to a selected one of a plurality of drive establishing positions in the corresponding range, a stationary plate generally normal to said lever and having an opening therethrough to receive said lever, a movable plate generally parallel to said stationary plate and also having an opening therethrough to receive said lever, one of said plates having markings thereon to indicate the several gear ratios in both ranges of speed, and the other of said plates having openings therethrough exposing said markings for all gear ratios in the high speed range upon movement of said lever to said high range neutral position and exposing said markings for all gear ratios in the low range upon movement of said lever to said low range neutral position, and means for releasably retaining said movable plate in the neutral position for the selected speed range while said gear shift lever moves relative thereto into a selected one of said drive establishing positions.

LOUIS JACOBI.

REFERENCES CITED

The following references are of record in the file of this patent:

UNITED STATES PATENTS

| Number | Name | Date |
|---|---|---|
| 1,427,415 | Raich | Aug. 29, 1922 |
| 1,764,515 | Klausmeyer | June 17, 1930 |
| 1,813,002 | Van Hamersveld | July 7, 1931 |
| 1,817,722 | Van Hamersveld | Aug. 4, 1931 |
| 2,273,068 | Ross et al. | Feb. 17, 1942 |
| 2,278,263 | Hoelscher | Mar. 31, 1942 |